United States Patent
Dinger

(10) Patent No.: US 7,440,359 B2
(45) Date of Patent: Oct. 21, 2008

(54) TIMEPIECE INCLUDING MEANS FOR DETERMINING THE ANGULAR POSITION OF AN ANALOGUE INDICATOR OF THE TIMEPIECE

(75) Inventor: Rudolf Dinger, Saint-Aubin (CH)

(73) Assignee: The Swatch Group Research and Development Ltd, Marin ( * ) Notice: Subject to any disclaimer, the term of this patent is extended or adjusted under 35 U.S.C. 154(b) by 0 days.

(21) Appl. No.: 11/866,709

(22) Filed: Oct. 3, 2007

(65) Prior Publication Data

US 2008/0080321 A1    Apr. 3, 2008

(30) Foreign Application Priority Data

Oct. 3, 2006    (EP)    ................... 06121684

(51) Int. Cl.
*G04B 19/04*    (2006.01)
*G04B 19/06*    (2006.01)
*G04C 9/00*    (2006.01)

(52) U.S. Cl. ............................ 368/80; 368/187; 368/223

(58) Field of Classification Search ................ 368/80, 368/185–187, 200, 223
See application file for complete search history.

(56) References Cited

U.S. PATENT DOCUMENTS

| 4,645,357 | A | * | 2/1987 | Allgaier et al. | ............... 368/187 |
| 5,270,993 | A | * | 12/1993 | Besson et al. | .................. 368/80 |
| 6,038,523 | A | * | 3/2000 | Akahane et al. | ............. 702/150 |
| 6,330,207 | B1 | * | 12/2001 | Born et al. | ..................... 368/76 |
| 6,454,458 | B1 | * | 9/2002 | Born et al. | ................... 368/185 |
| 7,218,577 | B2 | * | 5/2007 | Bernasconi et al. | ........... 368/80 |

FOREIGN PATENT DOCUMENTS

| DE | 35 13 961 A1 | 10/1986 |
| EP | 0 841 538 A1 | 5/1998 |
| EP | 0 952 426 A1 | 10/1999 |
| EP | 1 662 343 A2 | 5/2006 |
| JP | 58-131583 | 8/1983 |
| JP | 2003-107174 | 4/2003 |

OTHER PUBLICATIONS

European Search Report issued in corresponding application EP 06 12 1684, completed Jan. 12, 2007.

* cited by examiner

*Primary Examiner*—Vit W Miska
(74) *Attorney, Agent, or Firm*—Griffin & Szipl, P.C.

(57) ABSTRACT

The timepiece includes a motor which drives at least one hand via a gear reduction train (8, 9, 10, 11, 12, 13), and means (22) for detecting at least one angular reference position of an intermediate wheel (9) forming part of the gear reduction train. The detection means are provided for supplying a signal having a first value when the intermediate wheel is occupying the angular reference position ($\alpha$) and for supplying a signal having a second value when the intermediate wheel (9) is occupying a second angular position ($\gamma$). The timepiece further includes identification (32) and comparison (33) means for determining, on the basis of the signals supplied by the detection means (22), at least once per revolution of the intermediate wheel (9), whether the real position of the intermediate wheel actually corresponds to the theoretical position thereof.

16 Claims, 3 Drawing Sheets

Pos: α β γ δ α β γ δ α β γ δ α β γ δ α β γ δ α β γ δ α β γ δ etc.

A: 1 0 0 0 1 0 0 0 1 0 0 0 1 0 0 0 1 0 0 0 1 0 0 0 1 0 0 0 etc.

B: 1 1 0 0 1 1 0 0 1 1 0 0 1 1 0 0 1 1 0 0 1 1 0 0 1 1 0 0 etc.

C: 1 1 0 1 1 1 0 1 1 1 0 1 1 1 0 1 1 1 0 1 1 1 0 1 1 1 0 1 etc.

TIMEPIECE INCLUDING MEANS FOR DETERMINING THE ANGULAR POSITION OF AN ANALOGUE INDICATOR OF THE TIMEPIECE

This application claims priority from European Patent Application No. 06121684.2, filed Oct. 3, 2006, the entire disclosure of which is incorporated herein by reference.

FIELD OF THE INVENTION

The present invention generally concerns timepieces provided with analogue display means including at least one mobile indicator and which comprise means for detecting steps taken by the mobile indicator. The present invention more specifically concerns timepieces of this type wherein step detection is used for checking the angular position of the mobile indicator.

BACKGROUND OF THE INVENTION

Electronic timepieces with an analogue display are known which include an internal digital timekeeper in addition to the hands rotating above the dial. This internal timekeeper is clocked by the same electric pulses that control the forward movement of the hands. In principle, the hands and the timekeeper move forward, in a synchronous manner. The use of this type of internal timekeeper in multifunction watches where the same hands are used for indicating the time or a second piece of information, such as for example an alarm time, is also known. In fact, an internal timekeeper is necessary if one wishes to be able to continue counting the time that has elapsed while the hands are occupied with displaying the second piece of information. When the hands then return to their time display function, the data contained in the internal timekeeper allows them to reset to the correct time.

However, if one wishes an application like that just described to be satisfactory, one must be able to prevent the appearance of any difference between the time displayed by the hands of the watch and the time given by the internal timekeeper. It is known that this difference may occur for example if the watch has experienced a shock or because of an electromagnetic or even a mechanical disturbance (dust in the gear train for example). Because of these disturbances, the motors of some timepieces lose steps. Every analogue timepiece is thus liable to show a difference between the counting of the control pulses and the angular position of the hands. If this difference is not corrected in time, it may increase to the point where it results in totally erroneous indications. Moreover, in multifunction timepieces, the hands must be able to move not only forwards, but also backwards, depending upon variations in the quantity to be indicated. Further, the hands of a multifunction timepiece must be capable of changing position quickly forwards or backwards, when the function is changed. In order to satisfy these constraints, the hands of multifunction timepieces are generally each driven by their own motor. Consequently, instead of the single internal timekeeper described hereinbefore, multifunction timepieces generally comprise a counting/count-down circuit for the control pulses of the motor of each hand. It will be understood, moreover, that the motors of a multifunction timepiece have to satisfy considerably greater stresses. In these conditions, the risk of any difference, or in other words desynchronization of the hands, is also considerably higher for a multifunction timepiece than for any other.

In order to overcome the problems that have just been described, it is known to complete the motor control pulse counting/count-down with detection of the real position of the hands. EP Patent No. 0 841 538, in particular, discloses a timepiece that includes a watch movement driving an analogue display. This movement includes a wheel secured in rotation to one of the hands, and a magnetic sensor, which is for detecting the position of the wheel. In order to allow such detection, the plate of the wheel is covered in places with a magnetic film that defines a complex pattern, such that the magnetic sensor supplies a 1 or 0 signal depending upon whether or not it is opposite a place covered with magnetic film. The timepiece further includes electronic means for determining, from the 1 and 0 sequence, whether the position of the hand actually corresponds to the theoretical position. The device disclosed in this latter document has some drawbacks. In particular, detection of the loss of a step can only occur retrospectively. Moreover, the operation of covering the plate of a wheel with a pattern cut into a magnetic film can only increase manufacturing costs.

EP Patent No. 0 952 426 discloses another solution, which addresses the same technical problem. This document also discloses a timepiece movement comprising a wheel secured in rotation to one of the hands. This wheel is formed of a plate that has at least one aperture located in the intermediate region between the axis of rotation and the circumference. The timepiece further includes a device for detecting the angular position of the wheel. This device includes an inductive or capacitive sensor, arranged such that it is located directly above the aperture in the plate when the wheel is occupying a particular position. The sensor is sensitive to the variation in the quantity of metal located in immediate proximity. The amplitude of the signal sensed by the sensor thus varies depending upon whether it is located opposite a full segment or, conversely, the aperture in the plate of the wheel. The device further includes a memory for storing the signal amplitude after each step and electronic data processing means for determining retrospectively, from the data stored, the instant at which the aperture in the plate was located directly above the sensor.

The prior solution that has just been described also has some drawbacks. In particular, the wheel whose angular position is detected rotates at the same rhythm as a hand. If the plate of the wheel only has a single aperture, the angular position of the wheel, or of the hand, is only sensed once per revolution. It is known that in usual timepieces, a hand is expected to make a minimum of sixty steps per revolution. It may therefore be necessary to wait 60 steps before being able to verify the position of the hand. Moreover, the rotational amplitude of a hand corresponding to a single step is very limited (six degrees at best). In such conditions, there is only a tiny change in the intensity of the signal detected by the sensor from one step to the next, and it is not possible to detect reliably the instant at which the aperture passes directly above the sensor. This is why, according to the prior art, determination of the position of the hand does not occur in real time, but retrospectively.

EP Patent No. 1 662 343 discloses a timepiece comprising an optical sensor for detecting a reference position. Like the preceding timepieces, this one comprises a timepiece movement including a wheel secured in rotation to one of the hands. This wheel meshes with the pinion of an intermediate wheel set, which is itself driven by a stepping motor. The gear ratios are such that the intermediate wheel set completes an integer number of rotations during each revolution of the hand. The wheel secured to the hand and the wheel of the intermediate wheel set partially overlap. These two wheels are each formed of a plate having an aperture made in the overlap zone of the two wheels. In such conditions, the apertures of the two wheels are in a superposed position exactly once during each revolution of the wheel secured to the hand. This periodic coincidence of the position of the two apertures defines the reference position of the hand. An optical sensor is also arranged at the place where the positions of the two apertures coincide. The optical sensor is formed of a light source and a photosensor arranged on either side of the two wheels such that the light from the light source cannot reach the photosensor, except when the two apertures are located in the extension of each other. The signal provided by the optical sensor is used to determine the instant that corresponds to the passage of the hand into the reference position thereof.

Unlike the case of the wheel secured to the hand, each step of the motor produces a relatively large movement of the intermediate wheel aperture. In such conditions, the signal intensity detected by the sensor passes practically from all to nothing between one step of the motor and the next. It is thus, theoretically, possible to detect the exact instant at which the hand passes into the reference position thereof in real time. The fact remains, however, that the reference position is only detected once per revolution of the hand. As with the timepiece movement of the preceding document, it may thus be necessary to wait for the motor to complete 60 steps, or more, before being able to verify the position of the hand.

The abstract of JP Patent No. 58131583 discloses a timepiece which includes a timepiece movement with hands. The timepiece includes a device for detecting the angular position of one of the hands. This device includes a magnet secured to the hand, and a series of Reed contacts arranged around the circumference of the dial and separated from each other by an interval corresponding to two steps of the hand. If it is assumed that the hand completes 60 steps per revolution, the timepiece will have to include 30 Reed contacts. This feature leads to an increase in manufacturing costs and is suited only to relatively large sized timepieces.

The abstract of JP Patent No. 2003107174 discloses a timepiece wherein the stepping motor is provided with electronic detection means for verifying, after each control circuit pulse, that the motor has in fact completed a step. This solution also has some drawbacks. Indeed, the electromagnetic field in the timepiece motor is generated both by the electric pulses powering the coils and by the magnet rotating with the rotor. In such conditions, the loss of one step by the motor leads only to a relatively moderate variation in the signal detected by the electronic means. Thus, the solution proposed in this prior document requires the implementation of a sufficiently sensitive and thus relatively sophisticated detection system. Moreover, any electromagnetic interference occurring in proximity to the watch is liable to cause errors in the detection system.

SUMMARY OF THE INVENTION

It is an object of the present invention to overcome the drawbacks that have just been described by providing a timepiece in accordance with claim 1.

It will be understood that, in the invention, the comparison means are able to verify the real position of the intermediate wheel at least once per revolution completed by the latter. Moreover, it is known that, in a reducer gear train, the number of rotor revolutions necessary to make an intermediate wheel complete one revolution is less than the number of revolutions necessary to make the mobile indicator complete one revolution. In such conditions, the delay between the accidental loss of one step, and detection of that incident, is reduced compared to the devices of the prior art.

According to an advantageous embodiment of the present invention, the number of rotor revolutions necessary to make the intermediate wheel complete once revolution does not exceed 10. Owing to this feature, detection of any discrepancy between the real position of the intermediate wheel and the state of the counting means occurs with a delay that does not exceed ten rotor revolutions (almost real time).

According to another advantageous variant of the present invention, detection of at least one angular reference position uses a magnet secured to the intermediate wheel and occupying an off-centre position relative to the axis of the latter, and a magnetic sensor arranged opposite one point on the trajectory of the magnet so as to detect the passage of the latter.

According to yet another advantageous variant of the present invention, the timepiece motor is a stepping motor, and the timepiece further includes first memory means for storing the signals provided by the detection means over a period corresponding to at least one complete revolution of the intermediate wheel, and the identification and comparison means are provided for establishing, on the basis of the signals stored by the first memory means, a correspondence between a particular state of the first counting means and the angular reference position. Since the number of motor steps necessary to make the intermediate wheel complete one revolution is limited, the memory size necessary for implementing this feature is entirely reasonable.

According to yet another advantageous variant of the present invention, one complete revolution of the intermediate wheel corresponds to at least three motor steps. In fact, contrary to the situation that would occur if one complete revolution corresponded to only two motor steps, when the motor makes at least three steps per revolution, it is possible to distinguish a step forward from a step backwards.

BRIEF DESCRIPTION OF THE DRAWINGS

Other features and advantages of the present invention will appear upon reading the following description, given solely by way of non-limiting example, and made with reference to the annexed drawings, in which.

DETAILED DESCRIPTION OF THE ILLUSTRATIVE EMBODIMENTS

Figure 1:
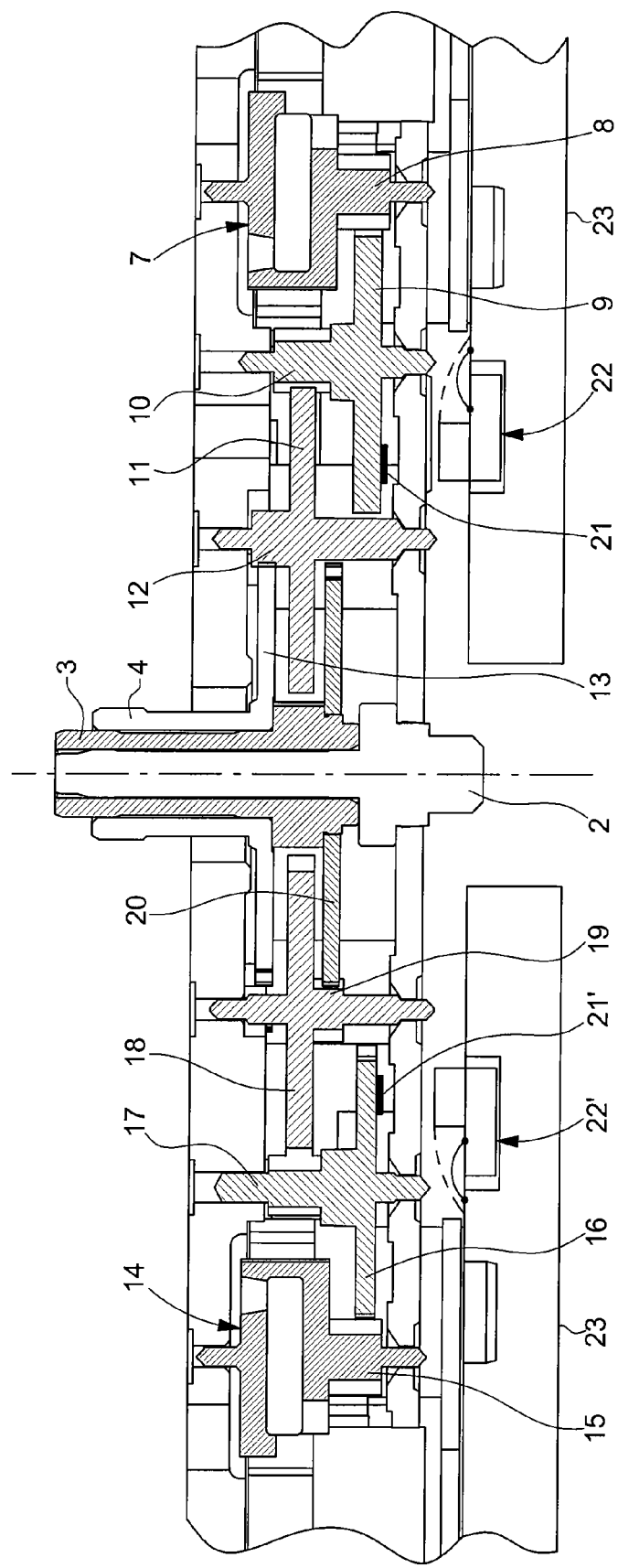
FIG. 1 is a cross-section of a timepiece movement forming part of a timepiece according to an embodiment of the invention.

The timepiece whose movement is shown in cross-section in FIG. 1 includes a central arbour 2 about which two pipes (referenced 3 and 4) rotate, said pipes being concentrically mounted for carrying respectively the minute hand and the hour hand (not shown). In the movement of FIG. 1, the two hands are driven independently of each other by two motors (of which only the rotors are shown and respectively referenced 7 and 14 in FIG. 1). These stepping motors can be controlled both backwards and forwards, and the timepiece movement to which they are fitted is thus suitable for use in multifunction timepieces. The first motor 7 drives the hour hand via a first reduction gear train formed of the motor pinion 8, the intermediate wheel 9 and the pinion 10 thereof, wheel 11 and the pinion 12 thereof, and finally, hour wheel 13. The second motor 14 drives the minute hand via a second reduction gear train formed of the motor pinion 15, intermediate wheel 16 and the pinion 17 thereof, wheel 18 and pinion 19 thereof and, finally, minute wheel 20. The following description will concentrate on the first kinematic chain which connects motor 7 to the hour hand. It will be understood however that the same explanations also apply to the second kinematic chain driving the minute wheel.

The motor driving the hour hand is a stepping motor whose rotor 7 is designed to complete one rotation at each step. The gear ratio between intermediate wheel 9 and motor pinion 8 is 4:1. Intermediate wheel 9 is thus designed to rotate at the rhythm of one revolution every 4 motor steps. It should also be specified that, in the movement described, the hour wheel and the minute wheel are both designed to complete one revolution every 180 motor steps.

FIG. 1 also shows a small magnet 21, which is secured underneath the plate of intermediate wheel 9. Magnet 21 is secured in proximity to the outer edge of the wheel, but set back from the toothing thereof. The magnet is thus secured to the intermediate wheel, and it passes once per revolution immediately above a Reed microcontactor (designed hereafter by the abbreviation MR and referenced 22 in the Figures). The MR forms part of the electronic components mounted on a printed circuit 23, itself secured underneath the motor-bridge. The position of MR 22 is selected such that magnet 21 passes directly opposite the latter once each revolution of intermediate wheel 9. It should also be specified that, in the present embodiment, the intermediate wheel 16 forming part of the gear train that drives the minute wheel carries a second magnet 21' which is for activating a second MR referenced 22'.

It will be understood that the MR described in this example must be of small dimensions. However, there exist MRs that are sufficiently small to suit such applications. In particular, one could cite the MicroReed-14 developed by ASULAB SA, CH-2074, Marin, Switzerland.

A Reed contactor is a contact sensitive to the magnetic field. This contact closes in the presence of a sufficiently intense field, but remains open if the field does not exceed a certain threshold. A Reed contactor thus lends itself to use as a magnetostatic sensor for detecting the presence of a magnetic field whose intensity exceeds a certain value. The timepiece whose movement has just been described thus includes two MRs referenced 22 and 22'. It also includes electronic means, which are connected to the MRs and which form therewith magnetic field detection means. These magnetic field detection means are for supplying a binary signal whose value depends upon the open/closed state of the contact. In the following description, the value "1" will be attributed to the signal supplied by the detection means when the contact is closed, and the value "0" will be attributed to the signal supplied by the detection means when the contact is open.

Figures 2A, 2B:
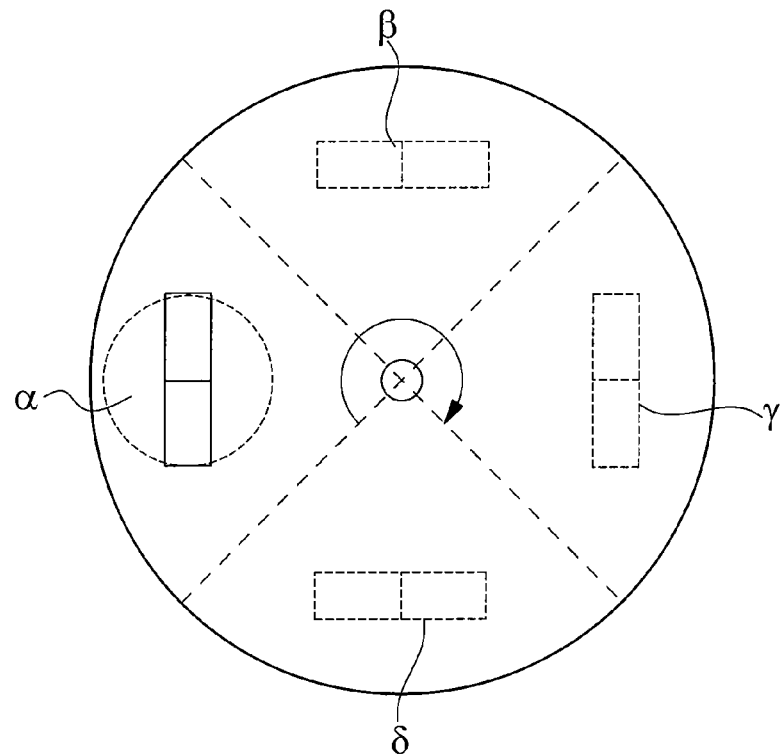
FIG. 2A is a schematic diagram of an intermediate wheel of the timepiece movement of FIG. 1, illustrating the four positions that the magnet carried by said wheel can occupy via the action of the stepping motor.
FIG. 2B is a table showing the succession from 1 and from 0 supplied by the magnetic sensor in various cases.

In accordance with the preceding convention, the information supplied by the magnetic field detection means may be assimilated with a series of 1 and 0 reflecting the state of the sensor after each step of the motor control. Since intermediate wheel 9 completes one revolution every four motor steps, the sequence of 1 and 0 should be repeated regularly with a period of four steps, provided that there has not been any reversal of the direction of operation. Let us recall that, according to the present invention, the detection means supply a signal having a first value when the intermediate wheel is occupying a first angular position and they supply a signal having a second value, different from the first, when the intermediate wheel is occupying a second angular position. FIG. 2 shows the four positions α, β, γ and δ that magnet 21 can occupy in the embodiment that forms the subject of this example. When magnet 21 is occupying position α, it is located directly above MR 22. In this position, the intensity of the magnetic field at the MR is at the maximum, and the contactor thus has to be closed in this position. The value of the signal provided by the detection means when the magnet is occupying position α is thus "1". Conversely, when magnet 21 is occupying position γ, the distance separating it from MR 22 is at the maximum, and the contactor must therefore be open in this second position. The value of the signal provided by the detection means when the magnet is occupying position γ is thus "0".

As regards the value that the signal takes in the two other positions of the magnet (positions β and δ), a certain number of variants may occur. Indeed, in these two latter positions, the intensity of the magnetic field at the MR is intermediate between the intensity of position α and the intensity of position γ. A priori, the signal provided by the detection means can thus just as easily take value "0" as value "1". The table of FIG. 2B describes three variants of the present invention. In the first of these variations (line A of the table), it can be seen that the MR is only closed in position α, when magnet 21 is located directly above the latter. The MR remains open in the other three positions of the magnet. These positions thus correspond to three successive 0s. Variant A corresponds to the use of a relatively weak magnet which only manages to close the contact if it is in immediate proximity to the latter. In the second variant shown (line B) it can be seen that the MR is closed in positions α and β of magnet 21, and that the MR is open in positions γ and σ. The intensity of the magnetic field at the location of the MR is theoretically the same in position β and in position δ. However, because of hysteresis, the critical intensity of the magnetic field which just allows the MR to be closed, is higher than the critical intensity that just allows it to open. This is why the same magnetic field intensity is enough to keep the contact closed when the magnet passes from position α to position β, but is not sufficient to close the contact again when the magnet passes from position γ to position δ. It should be specified that the table of FIG. 2B does not take into consideration the possibility of a reversal in the direction of operation. In such a situation, where the motor rotates backwards, one could say that variant B is reversed. In other words, the contact is closed in position δ and open in position β. However, the direction of rotation has no effect on the contact in positions α and γ. Finally, in the third variant shown (line C), it can be seen that positions δ, α and β of magnet 21 correspond to three successive 1s, and that the only 0 is associated with position γ. It will be understood that case C corresponds to the use of a relatively strong magnet.

In order to make the timepiece forming the subject of this example, the components are preferably dimensioned such that the detection means supply a signal that conforms to variant B. However, it is possible for certain copies of this timepiece to correspond to variant A or to variant C. Indeed, if one is working with usual tolerances, the probability of a copy dimensioned in accordance with variant B actually having the features of variant A or variant C is reduced but not to zero. According to an advantageous feature of the present invention, this type of variation between copies does not constitute a problem. Indeed, the means for detecting an angular reference position of the intermediate wheel can be based on the following principle. In the presence of three consecutive 1s (variant C), the second of these is corresponds to position α of the magnet 21. In the presence of two consecutive 1a (Variant B), the first of these is corresponds to the position α of the magnet. In the event that the 1s are not consecutive (variant A), these isolated 1s correspond to position α of the magnet.

Figure 3:
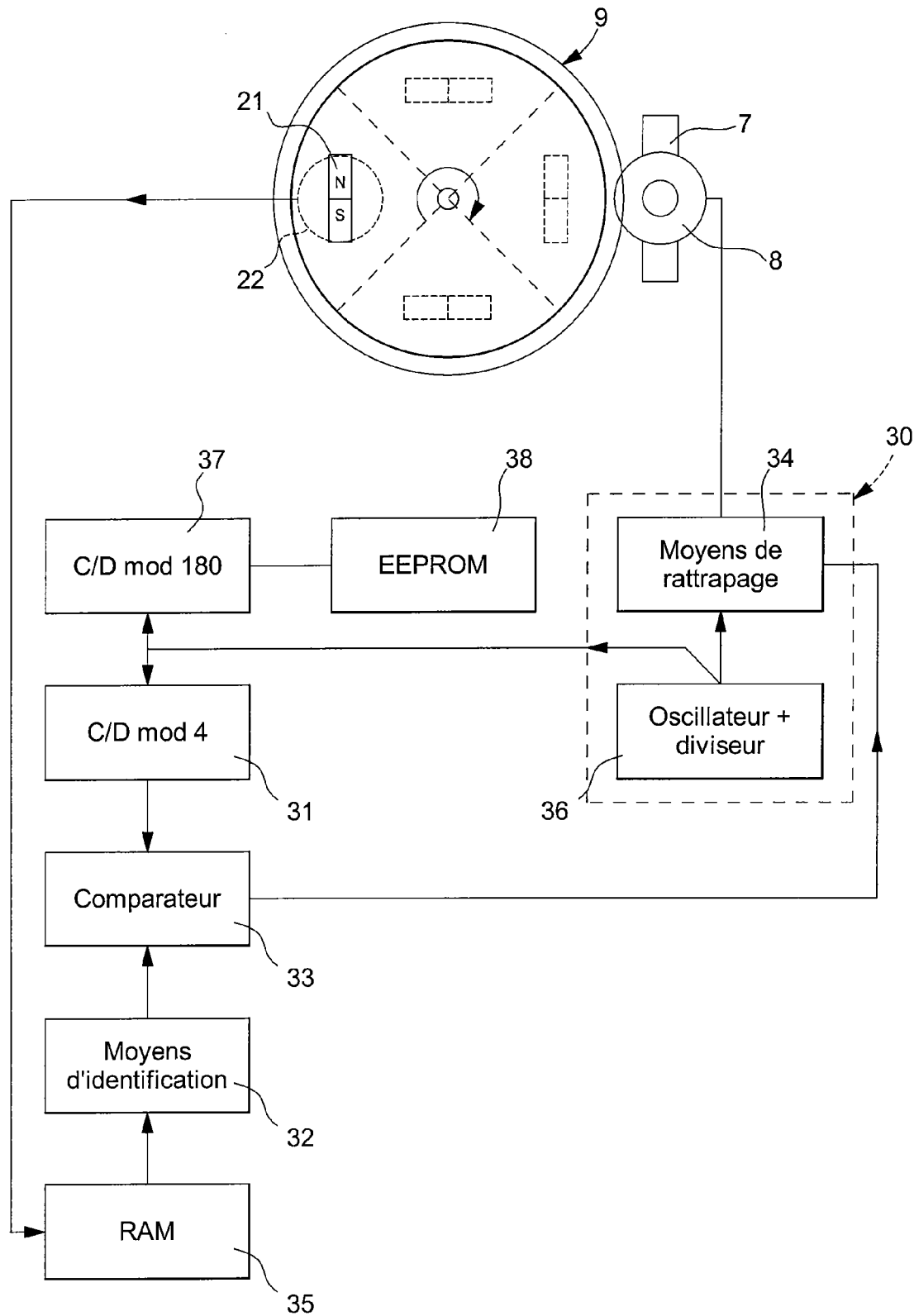
FIG. 3 is a flow chart of the means for controlling the motor steps, and the means for making up lost steps.

FIG. 3 is a flow chart of the means for controlling, checking and correcting the position of the intermediate wheel. It has been seen that the timepiece of this example in fact includes means for detecting the positions of two intermediate wheels, one associated with the hour hand and the other associated with the minute hand. The following explanations are given solely with reference to intermediate wheel 9 associated with the hour hand. It will be understood however that the same explanations also apply to detection of the position of the other intermediate wheel 16.

The diagram of FIG. 3 shows intermediate wheel 9, which is driven by pinion 8 of motor 7. In a known manner, motor 7 obeys the pulses supplied by a control circuit 30, which includes a quartz oscillator and a divider 36. The control circuit is for rotating the motor rotor forwards or backwards step by step. The diagram also shows a counter/count-down counter 31, which also receives the signals supplied to the motor by control circuit 30. The counter/count-down counter 31 is incremented by one unit each time that the control circuit produces a pulse causing one forward step, and decremented by one unit each time that the control circuit produces a pulse causing a backward step. Counter/count-down counter 31 is a modulo-4 counter. In these conditions, in the absence of any incidents, there must exist a univalent correspondence between the four possible states of counter 31 and the four positions occupied by intermediate wheel 9.

The diagram of FIG. 3 also shows a two state magnetic sensor, which is formed by Reed contactor 22 and the power means associated therewith. The magnetic sensor produces a signal formed by a series of 1 and 0, which corresponds to the closed or open state of the MR after each pulse of control circuit 30. The signal from the magnetic sensor is sent to a RAM memory referenced 35, which stores the last N values taken by the signal. As, in this example the signal sequence is repeated every four steps, it is possible to limit the storage to two values. From this information, the identification means 32 are able to identify the step corresponding to reference position α of intermediate wheel 9. In accordance with the preceding explanation, the identification means are based for example of the following principle. In the presence of three consecutive 1s, the second of these is correspond to position α of intermediate wheel 9. If the is are never consecutive, these isolated is correspond to position α of intermediate wheel 9. According to an advantageous variant, in addition to position α, identification means 32 are also used for identifying the position γ of the intermediate wheel by analysing the series of consecutive 0s in accordance with the same principle.

Comparison means 33 are also provided for comparing the position of intermediate wheel 9 determined by identification means 32 with the position in which the wheel should theoretically be in according to counter/count-down counter 31. Any disagreement between these two pieces of information would indicate the loss of at least one step by the motor. In these conditions, comparison means 33 will, in a manner known to those skilled in the art, send a signal to an additional pulse 34 so as to make the motor catch up on the steps that it has lost. In accordance with the preceding description, identification means 32 identify retrospectively the step corresponding to the a position. However, one need only wait for the first 0 following a series of 1s in order to know to which step position α of intermediate wheel 9 corresponds. In the absence of any reversal of the rotational direction of the motor, the identification delay does not therefore exceed the duration of two steps. In this example, this delay corresponds to a positioning error of the hour hand of 4°. The identification means thus work practically in real time.

The diagram of FIG. 3 shows that the timepiece of the present invention includes a second counter/count-down counter 37. This is a modulo-180 counter/countdown counter. Like counter 31, counter 37 is incremented or decremented by one each by each pulse supplied by control circuit 30. There therefore exists a univalent correspondence between the 180 possible states of counter 37 and the 180 positions occupied by the hand around the dial. It can also be seen that counter/count-down counter 37 is connected to a non-volatile memory 38. The function of non-volatile memory 38 is to save the position of the hour hand, for example, when the battery (not shown) which powers the timepiece has to be changed. Thus, as soon as the supply voltage provided by the battery falls below a threshold value, counter/count down counter 37 transfers its content to the non-volatile EEPROM memory 38. As soon as the watch battery has been replaced, counter 37 reads the position of the hand, in non-volatile memory 38 and thus returns to the state corresponding to the real position of the hand. At this stage, even if the watch is slow, the correspondence between the position of the hands and the state of counter 37 is preserved. The person wearing the watch thus only needs to use the control stem in a known manner in order to reset the watch to the correct time.

The features that have just been described are particularly advantageous when, as in the present case, they are associated with a watch wherein at least two motors each drive an independent hand. Indeed, with such watches, it is possible for a battery failure to occur at a time when the hands are desynchronised to display information other than the time. In such conditions, saving the position of each of the hands in the non-volatile memory allows the watch to be reset to the correct time without having to resort to resynchronisation of the hands.

Those skilled in the art will understand that, in order for the state of counter/count down counter 37 to correspond to the position of the hour hand, the position of this hand must first of all be initialised. However, initialisation does not need to be repeated following each battery change since the state of counter/count-down counter 37 is saved in non-volatile memory 38. A single initialisation operation may thus be sufficient to ensure that the watch works for its entire life.

It will also be understood that the diagram of FIG. 3 is a flow chart. The different boxes that appear in the diagram thus do not generally correspond to distinct devices. In the preferred variant of the embodiment described, all of the tasks described with reference to FIG. 3 are, in fact, accomplished by a single microcontroller programmed accordingly and integrated in the timepiece.

It will also be understood that various alterations and/or improvements evident to those skilled in the art could be made to the embodiment that forms the subject of this description without departing from the scope of the present invention defined by the annexed claims. In particular, instead of being incremented by the control pulses supplied by frequency divider 36, counter/count-down counter 37 could be incremented by identification means 32 as a function of the signals supplied by detection means 22. This variant would ensure that the state of counter 37 really corresponds to the position of the hand. This would be the case even if motor 7 were blocked such that the catch up pulses are non-operative.

Moreover, the present invention is not limited to the use of a magnet associated with a Reed contactor. If intermediate wheel 9 is made of an insulating material, it is possible for example to replace the magnet secured to the wheel by a metal part, and to provide an inductive or capacitive sensor for detecting the passage of the metal part above the sensor. Conversely, if intermediate wheel 9 is made of metal, it is possible to use these same types of sensors associated with an aperture arranged in the plate of the intermediate wheel close to the periphery thereof.

Further, the motor that drives the gear reduction train including intermediate wheel 9 does not need to be a stepping motor. Those skilled in the art will understand that any other type of motor, such as for example a synchronous motor, could be used in place of the stepping motor.

What is claimed is:

1. A timepiece including a timepiece movement associated with an analogue display including at least one mobile indicator, said timepiece movement including at least one motor and control means delivering pulses for controlling said motor, said motor being provided for driving said mobile indicator via a gear reduction train, said train including an intermediate wheel between the motor and a second wheel secured to the mobile indicator, the gear reduction train being provided for driving the intermediate wheel through a constant angle upon each revolution completed by the motor, the timepiece further including checking means for determining whether the real movement of the mobile indicator corresponds to the signal delivered by the control means, and correction means connected to the checking means and provided for controlling the motor so as to correct the position of the mobile indicator, the timepiece being wherein the checking means include means for detecting at least one angular reference position of the intermediate wheel, said detection means being provided for supplying a signal having a first value when the intermediate wheel is occupying said angular reference position and for supplying a signal having a second value, different from the first, when the intermediate wheel is occupying a second angular position, the timepiece being further wherein the checking means include first means for counting the pulses delivered by the control means, and identification and comparison means for determining, on the basis of the signal supplied by the detection means, at least one per revolution of the intermediate wheel, whether the real position of the intermediate wheel actually corresponds to the state of the first counting means.

2. The timepiece according to claim 1, wherein the constant angle, through which the intermediate wheel is driven upon each revolution completed by the motor, is equal to 2Π/N, where N≦10.

3. The timepiece according to claim 2, wherein the motor is a stepping motor including a rotor provided for rotating through an angle 2Π/N upon each step, such that the intermediate wheel can successively occupy exactly n*N distinct angular positions.

4. The timepiece according to claim 3, wherein 3≦n*N≦10.

5. The timepiece according to claim 4, wherein n*N=4 or n*N=6.

6. The timepiece according to claim 1, wherein the checking means include first memory means provided for storing the signals supplied by the detection means over a period corresponding to at least on complete revolution of the intermediate wheel, and wherein the identification and comparison means are provided for identifying, on the basis of the signal stored by the first memory means, the state of the first counting means, which corresponds to the angular reference position.

7. The timepiece according to claim 6, wherein the identification and comparison means are also provided for identifying the state of the first counting means which corresponds to the second angular position.

8. The timepiece according to claim 1, wherein said means for detecting at least one reference position of the intermediate wheel include a magnet secured to the intermediate wheel and occupying an off-centre position relative to said wheel, such that each angular position of the intermediate wheel corresponds to a distinct position of the magnet, and further including a magnetic sensor arranged opposite the intermediate wheel such that it supplies said signal having a first value when the magnet is occupying a first position and such that it supplies said signal having a second value when the magnet is occupying a second position.

9. The timepiece according to claim 1, wherein it includes second means for counting the pulses delivered by the control means, and second memory means for storing the position of the mobile indicator, said second memory means including a non-volatile memory for keeping a record of the state of the second counting means when the timepiece stops operating.

10. The timepiece according to claim 2, wherein said means for detecting at least one reference position of the intermediate wheel include a magnet secured to the intermediate wheel and occupying an off-centre position relative to said wheel, such that each angular position of the intermediate wheel corresponds to a distinct position of the magnet, and further including a magnetic sensor arranged opposite the intermediate wheel such that it supplies said signal having a first value when the magnet is occupying a first position and such that it supplies said signal having a second value when the magnet is occupying a second position.

11. The timepiece according to claim 3, wherein said means for detecting at least one reference position of the intermediate wheel include a magnet secured to the intermediate wheel and occupying an off-centre position relative to said wheel, such that each angular position of the intermediate wheel corresponds to a distinct position of the magnet, and further including a magnetic sensor arranged opposite the intermediate wheel such that it supplies said signal having a first value when the magnet is occupying a first position and such that it supplies said signal having a second value when the magnet is occupying a second position.

12. The timepiece according to claim 4, wherein said means for detecting at least one reference position of the intermediate wheel include a magnet secured to the intermediate wheel and occupying an off-centre position relative to said wheel, such that each angular position of the intermediate wheel corresponds to a distinct position of the magnet, and further including a magnetic sensor arranged opposite the intermediate wheel such that it supplies said signal having a first value when the magnet is occupying a first position and such that it supplies said signal having a second value when the magnet is occupying a second position.

13. The timepiece according to claim 5, wherein said means for detecting at least one reference position of the intermediate wheel include a magnet secured to the intermediate wheel and occupying an off-centre position relative to said wheel, such that each angular position of the intermediate wheel corresponds to a distinct position of the magnet, and further including a magnetic sensor arranged opposite the intermediate wheel such that it supplies said signal having a first value when the magnet is occupying a first position and such that it supplies said signal having a second value when the magnet is occupying a second position.

14. The timepiece according to claim 6, wherein said means for detecting at least one reference position of the intermediate wheel include a magnet secured to the intermediate wheel and occupying an off-centre position relative to said wheel, such that each angular position of the intermediate wheel corresponds to a distinct position of the magnet, and further including a magnetic sensor arranged opposite the intermediate wheel such that it supplies said signal having a first value when the magnet is occupying a first position and such that it supplies said signal having a second value when the magnet is occupying a second position.

15. The timepiece according to claim 7, wherein said means for detecting at least one reference position of the intermediate wheel include a magnet secured to the intermediate wheel and occupying an off-centre position relative to said wheel, such that each angular position of the intermediate wheel corresponds to a distinct position of the magnet, and further including a magnetic sensor arranged opposite the intermediate wheel such that it supplies said signal having a first value when the magnet is occupying a first position and such that it supplies said signal having a second value when the magnet is occupying a second position.

16. The timepiece according to claim 9, wherein said means for detecting at least one reference position of the intermediate wheel include a magnet secured to the intermediate wheel and occupying an off-centre position relative to said wheel, such that each angular position of the intermediate wheel corresponds to a distinct position of the magnet, and further including a magnetic sensor arranged opposite the intermediate wheel such that it supplies said signal having a first value when the magnet is occupying a first position and such that it supplies said signal having a second value when the magnet is occupying a second position.

* * * * *